(12) United States Patent
Isler

(10) Patent No.: US 8,365,659 B2
(45) Date of Patent: Feb. 5, 2013

(54) APPARATUS FOR PRINTING POULTRY EGGS

(75) Inventor: Werner Isler, Pfäffikon (CH)

(73) Assignee: Nuovo AG, Pfaffikon (CH)

( * ) Notice: Subject to any disclaimer, the term of this patent is extended or adjusted under 35 U.S.C. 154(b) by 569 days.

(21) Appl. No.: 12/085,735

(22) PCT Filed: Nov. 27, 2006

(86) PCT No.: PCT/CH2006/000664
§ 371 (c)(1),
(2), (4) Date: Dec. 9, 2008

(87) PCT Pub. No.: WO2007/062539
PCT Pub. Date: Jun. 7, 2007

(65) Prior Publication Data
US 2009/0255422 A1  Oct. 15, 2009

(30) Foreign Application Priority Data
Dec. 1, 2005 (CH) ..................................... 1906/05

(51) Int. Cl.
*B41L 27/26* (2006.01)
*B41F 17/00* (2006.01)
(52) U.S. Cl. ......................................... 101/125; 101/41
(58) Field of Classification Search .................. 101/125, 101/333, 41
See application file for complete search history.

(56) References Cited

U.S. PATENT DOCUMENTS

| | | | | |
|---|---|---|---|---|
| 1,875,811 | A | * | 9/1932 | Hilgers .............................. 101/2 |
| 2,601,700 | A | * | 7/1952 | Pinsky et al. .................. 425/105 |
| 3,094,920 | A | | 6/1963 | Priesmeyer |
| 3,530,792 | A | * | 9/1970 | Valiela ............................. 101/41 |
| 4,488,778 | A | * | 12/1984 | Polzer et al. ................... 359/871 |
| 6,892,637 | B2 | * | 5/2005 | Petersen ........................ 101/333 |
| 2004/0112233 | A1 | * | 6/2004 | Shibabuki et al. ............. 101/477 |

FOREIGN PATENT DOCUMENTS

| | | |
|---|---|---|
| DE | 70607 | 2/1893 |
| EP | 1 457 108 A2 | 9/2004 |
| GB | 21471 | 0/1911 |
| GB | 356 770 A | 9/1931 |
| GB | 1 218 895 A | 1/1971 |

* cited by examiner

*Primary Examiner* — Judy Nguyen
*Assistant Examiner* — Blake A Tankersley
(74) *Attorney, Agent, or Firm* — Weingarten, Schurgin, Gagnebin & Lebovici LLP

(57) ABSTRACT

Disclosed is a stamp head (1) for printing uneven surfaces, especially agricultural products such as poultry eggs, by means of screen printing. The stamp ink is stored in a tampon (5) within a stamp chamber (2) and is transferred to the egg surface with the aid of structures of a small coated screen printing plate (4). The stamp head (2) can be fastened to a stamp guiding assembly (7) via a stamp pressing element (10) such that an egg stamp (50) is created which can be vertically moved up and down on a stamp bar (18), the stamping process being carried out by means of the vertical movement. Several egg stamps (50) can be mounted on the stamp bar (18) such that a stamping apparatus is created which allows several eggs to be printed simultaneously.

19 Claims, 2 Drawing Sheets

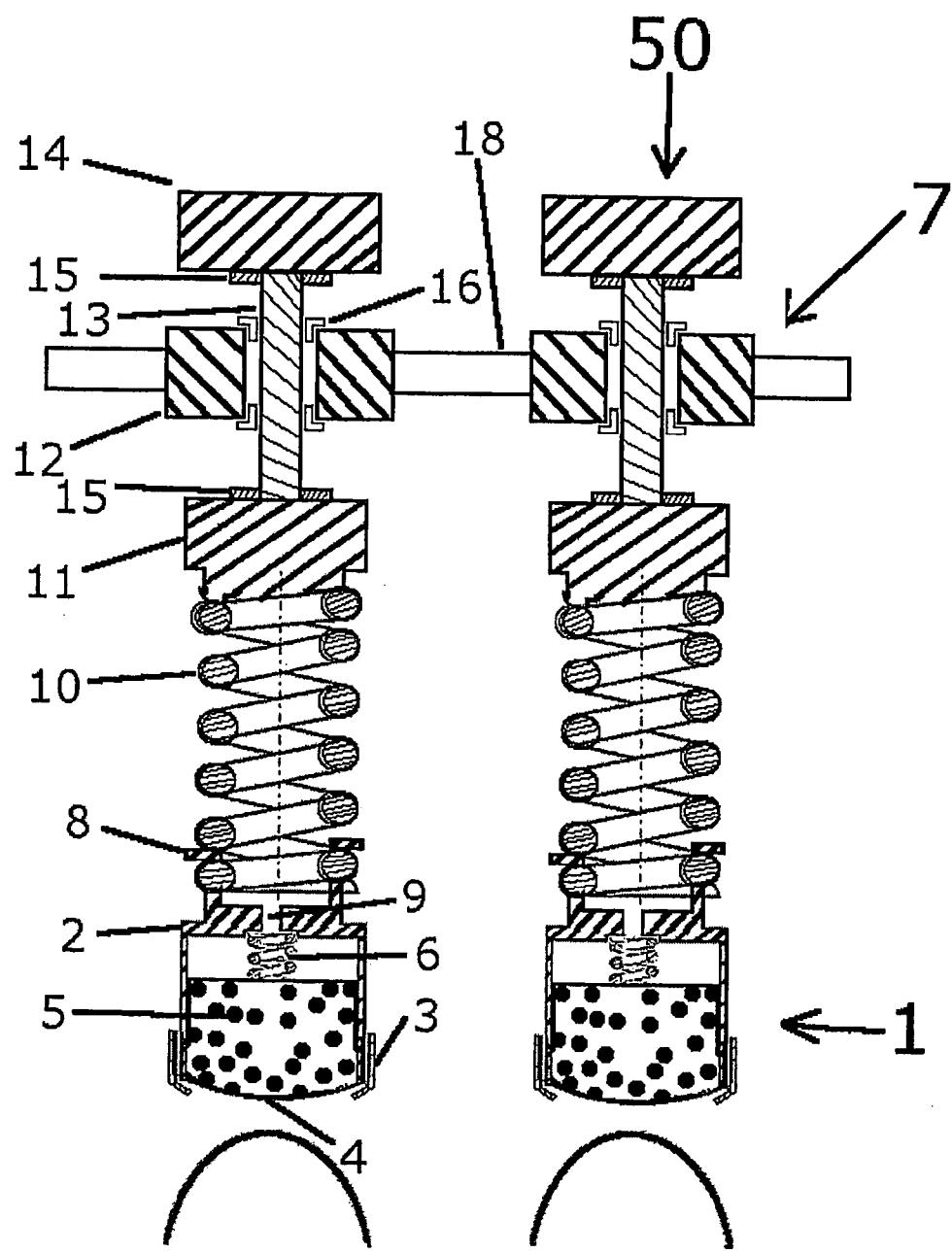

APPARATUS FOR PRINTING POULTRY EGGS

This application is a §371 national phase filing of PCT/CH2006/000664 filed Nov. 27, 2006, and claims the priority to Swiss Appln. No. 1906/05 filed Dec. 1, 2005.

TECHNICAL FIELD

The present invention describes an apparatus for printing uneven surfaces, especially agricultural products such as poultry eggs, by screen printing by means of a stamp head in which a tampon with a stamp ink is housed and which is closed off by a small screen printing plate.

PRIOR ART

Printing apparatus for the printing of uneven surfaces and of poultry eggs have already been known for a long time.

The egg stamper described in DE 70607 is constructed from a hollow cylinder which is closed off at one end by a stamp surface made of deformable material. This stamp surface is formed in a concave shape, projects into the volume of the hollow cylinder and has raised marks. A plunger is situated inside the hollow cylinder, the diameter of said plunger being selected so that it is movable in the hollow cylinder in a form-fitting manner. When the plunger is inserted into the hollow cylinder up to the stop, the plunger then presses onto the rear side of the stamp surface, so that the stamp surface forms a flat surface. The stamp ink can then be received by pressing the egg stamper onto a stamp pad. The hollow cylinder is held during the stamping process and the stamp surface is pressed onto the surface of the egg, in so doing, the marks of the stamp surface are printed onto the egg. The stamp surface fits itself to the surface of the egg, whereby a good printed image is produced. This stamping process corresponds to a high pressure method.

This apparatus can only be operated manually, which results in a variable and non-reproducible pressure force. In order to obtain good stamper results, the fact that the diameter of the hollow cylinder and the concave curvature of the stamp surface are coordinated with the surface of the egg appears to play a part.

A further arrangement for printing uneven surfaces is pursued in GB 191121471, in which a template printing device is described for marking animals, which is combined with a printing ink container. The cylindrically shaped printing ink container with a round cross-section is provided on one side with a template which is mounted on or screwed on. The opposite side of the container is closed by a cover through which a plunger is inserted concentrically and movably, which in the interior of the container presses the stamp ink through a piston ring in the direction of the template.

Before the stamping process, the plunger together with the cover is moved away from the printing ink container, so that the stamp ink can be fed in. Then the plunger and the cover are put in place again and the ink container is positioned on the surface which is to be printed. The plunger is then pressed in the direction of the template, whereby the stamp ink is pressed through the template and forms the desired marks on the surface.

This prior art also describes a manual printing of uneven surfaces and therefore a non-reproducible pressure force of the template onto the printing surface. Thereby, differing amounts of printing ink are applied onto the printing surface during the printing processes.

EP 1457108 describes a stamp of a hollowed-out and rotationally symmetrical container made of a soft plastic or rubber, on the underside of which a coated, convex and flexible membrane is fastened which closes off the stamp so that the interior of the stamp can be filled with a stamp ink. The membrane is coated with a film into which a structure is etched photochemically, which structure forms the stamp motif. During stamping, the stamp ink travels through the structure and arrives onto the surface of the egg.

In addition to two holes on the upper side of the stamp for filling the stamp with the stamp ink, a bore is provided for fastening the stamp on a bar in a stamp apparatus. In such an apparatus, several stamps can be arranged in series and by lowering the bar, several poultry eggs can be printed simultaneously. The solution shows an egg stamp which operates by the tampon printing process and is designed as a single-serving system. An exchanging of the stamp motif is not provided.

REPRESENTATION OF THE INVENTION

The object of the present invention is to provide a stamp head which is distinguished by simple and rapid re-filling of the stamp ink and exchanging of the small screen printing plate without dismantling the stamp. Furthermore, the level status of the stamp ink in the stamp head described here has no influence on the quantity of stamp ink which is delivered.

BRIEF DESCRIPTION OF THE DRAWINGS

The invention is described below in connection with the drawings.

FIG. 3 shows a stamp device with two egg stamps which are fastened to a horizontal stamp bar.

Figure 1:
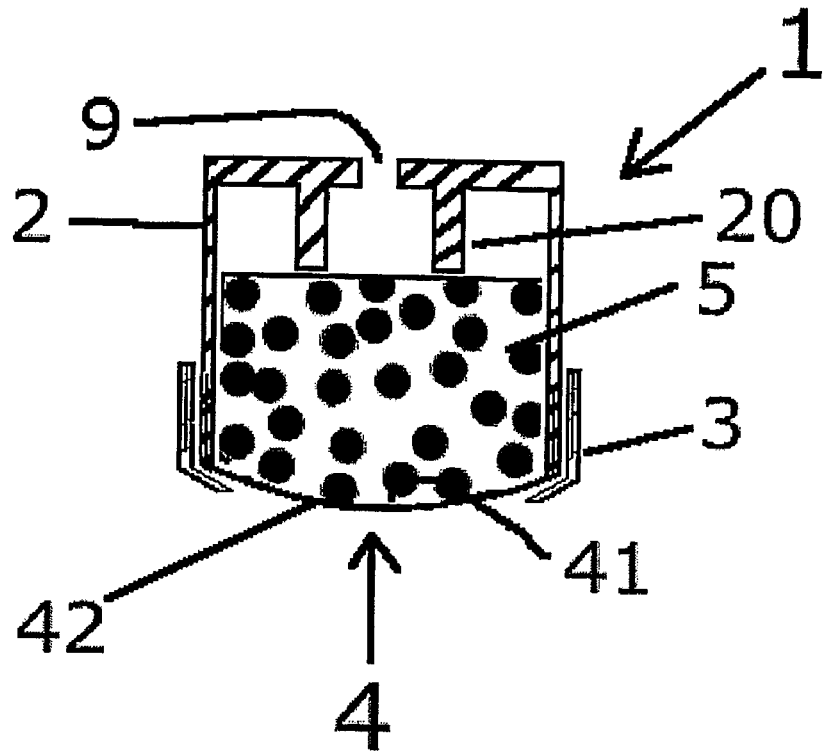
FIG. 1 shows a section through a single stamp head with a spacer element.
Figure 2:
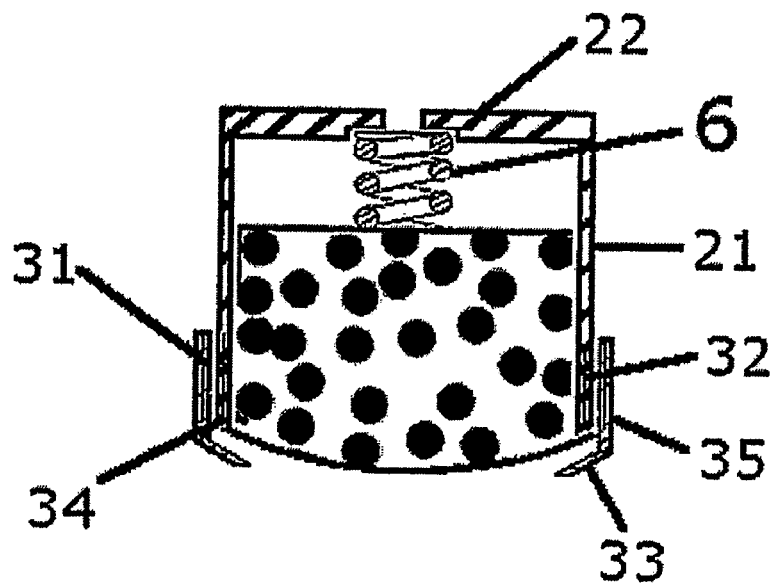
In FIG. 2 a sectional drawing is shown of a stamp head with a tampon pressing element.

In the attached drawing, a preferred example embodiment of the subject matter of the invention is illustrated and is explained by means of the following description.

DESCRIPTION

The multi-part stamp head 1 is constructed from a stamp head 2, in the simplest case cylindrical in shape, with a circular base surface, in the interior of which a tampon 5 is placed which receives the stamp ink. The stamp chamber 2 is formed by a cylindrical wall 21 which is closed off at the upper end by a covering surface 22. The cylindrical wall 21 and the covering surface 22 can be formed from one piece, as is shown in the figure, or from two parts which are securely connected with each other or are able to be joined together.

The thickness of the tampon 5 can be at a maximum equal to the depth of the stamp chamber 2 and hence completely fill the volume of the stamp chamber 2. The tampon 5 is produced from an open-pored microporous material, such as polyurethane foam for example, which can absorb and store the stamp ink. The surface of the tampon 5 which faces away from the stamp chamber 2 can be flat here, or can be concave (e.g. in the manner of an ellipsoid) in shape.

In the circular covering surface 22 of the stamp chamber 2 there is situated a ventilation- and re-filling opening 9 in the form of a through-bore which can serve for pressure equalization during the stamping process and for re-filling the stamp ink. The filling of the stamp chamber 2 with the stamp ink can therefore be carried out simply and quickly without dismantling the stamp head 1. To prevent the stamp-ink from escaping through the ventilation- and re-filling opening 9, it is advantageous to select the thickness of the tampon 5 to be somewhat smaller than the depth of the stamp chamber 2 and to use a spacer element 20 which is loose or is fastened to the chamber. An inserted spiral spring can serve as a loose spacer element, for example.

Underneath the tampon 5 there is situated a small screen printing plate 4, the chamber side 41 of which lies against the tampon 5. The small screen printing plate 4 consists of a flexible plastic which is elastic, stretchable and hard-wearing.

The small screen printing plate 4 is coated with a barrier layer of a light-sensitive photo-emulsion or of a light-sensitive film on the delivery side 42. By exposure with UV light, parts of the barrier layer which are covered in a light-tight manner form transmission channels which are able to be washed out, which form a template for the subsequent printing.

The barrier layer can be pressed by the stamp ink through the transmission channels from the chamber side 41 up to the pressure side 42 and arrive onto the print object. Different stamp inks with various characteristics are available on the market. Stamp inks are also available for the foodstuffs field which, in addition to the desired characteristics with regard to flow and printing are also licensed by the Health Departments for printing on foodstuffs. To prevent drying out, oil-based stamp inks are used here.

The small screen printing plates 4 are to be circular in shape and to have a raised form, by the pressure side 42 being curved in a convex manner away from the tampon 5. During the printing process, the pressure side 42 of the small screen printing plate 4 is lowered until it comes into contact with the surface of the hen's egg which is to be printed and surrounds the latter, whereby a plane printing of the convex surface of the egg is ensured with the most varied of sizes and shapes of egg.

The diameter of the small screen printing plates 4 is to be greater than or equal to the diameter of the covering surface 22 of the stamp chamber 2, so that the small screen printing plate 4 is able to be fixed on the stamp chamber 2 and can span this, without the stamp ink being able to escape onto the print object past the edge of the small screen printing plate 4. A small screen printing plate mounting 3 with an internal thread 31 which is able to be screwed onto an external thread 32 of the stamp chamber 2 serves for fastening the small screen printing plate 4, whereby the small screen printing plate 4 is stretched over the tampon 4 and the stamp chamber 2. The small screen printing plate 4 must be stretched so that an optimum print result is produced and the stamp ink is pressed in a defined manner through the transmission channels lying taut on the curved surface of the hen's egg.

The small screen printing plate mounting 3 has an annular wall 35 with the above-mentioned internal thread 31. A radially inwardly directed collar-shaped pressure surface 33 is formed on the end. This pressure surface 33 can run perpendicularly to the annular wall 35 or, preferably, in an inclined manner. The inclination of the pressure surface corresponds approximately to the curvature of the small screen printing plate 4 along its edge. Likewise, the edge of the cylindrical wall 21 is shaped so as to be adapted to this inclination or is constructed with a rounded pressure edge 34, so that a defined linear bearing occurs on pressing, without causing a distortion of the small screen printing plate 4.

The small screen printing plate 4 is consequently fixed in a taut manner ( . . . ) pressure surface 33 of the small screen printing plate mounting 3 and the cylindrical wall 21 of the stamp chamber 2, underneath the tampon 5. In order to tighten the small screen printing plate 4, the diameter of the small screen printing plate 4 must be slightly greater than the diameter of the stamp chamber 2, so that a slight pre-stressing occurs, which assists the convex curvature of the small screen printing plate 4. In addition to the above-mentioned screw connection 31, 32, the small screen printing plate mounting 3 can also be fixed in a clamping manner on the stamp chamber 2. Thereby, a form-fitting and also a force-fitting connection of stamp chamber 2 and small screen printing plate mounting 3 is possible.

The components of the stamp head 1, stamp chamber 2 and the small screen printing plate mounting 3 can be optionally milled from metal, light metal, produced from plastic by injection moulding or manufactured from flexible plastic.

In order to ensure that the tampon 5 lies against the chamber side 41 of the small screen printing plate 4 and so that the stamp ink reaches the print object during the printing process through the transmission channels, a tampon pressing element 6 can be integrated into the stamp head. Here, the tampon pressing element 6 presses the tampon 5 in the direction of the longitudinal axis of the stamp head 1 against the curved small screen printing plate 4. The tampon pressing element 6 can be realized for example in the form a helical spring which is placed between the covering surface 22 of the stamp chamber 2 and the tampon 5 and is fixed by milling in the covering surface 22 of the stamp chamber 2.

The structure of an egg stamp 50 using the stamp head 1 described above can consist of the stamp head 1, a stamp pressing element 10 and a stamp guiding assembly 7. In order to move the stamp head 1 vertically upwards and downwards, it is fastened to the stamp guiding assembly 7. The fastening takes place via the stamp pressing element 10, which constitutes an articulated connection, and can be realized by a helical spring, a simple rubber elastic element or a cardan shaft. In a further embodiment, the stamp pressing element 10 can be constructed as a ball joint, on the ball of which the stamp head 1 is mounted.

The stamp pressing element 10 allows the stamp head to incline as desired in order to ensure a correct stamping of an inclined surface of the material which is to be stamped or respectively the egg shell.

When a helical spring is used as a stamp pressing element 10, it is useful to provide a fastening bead 8 on the stamp chamber 2, so that the stamp pressing element 10 does not slip off from the stamp chamber 2 unintentionally. On the side lying opposite the stamp head 2, the stamp pressing element 10 is fastened to a stamp pressing weight 11 which presses the stamp pressing element 10 together with the stamp head 1 onto the hen's egg. The contact pressure of the stamp head 1 onto the egg is defined by the weight of the stamp pressing weight 11 and is therefore always identical. The stamp pressing weight 11 is fastened to a guide rod 13 which runs through a stamp fastening element 12. In order to achieve a quiet and error-free linear movement, it is expedient to provide a bearing bore 17 in the stamp fastening element 12 with a plastic bearing bush 16. The linear movement, guided by the guide rod 13, has play perpendicularly to the longitudinal axis of the guide rod 13, because a non-rigid stamp pressing element 10 is used. By these means, a linearly guided upward and downward movement of the stamp head 1 is to be achieved with controlled contact pressure, which carries out the screen printing process on the surface of the hen's egg in a reproducible manner.

The downward movement of the egg stamp 50 is limited by a movement limiter 14 at the upper end of the guide rod 13, which can be constructed almost arbitrarily. Damping rings 15 on the surfaces of the stamp pressing weight 11 allocated to the guide rod 13 and of the movement limiter 14 provide for a damped stopping of the upward and downward movement.

In order to print several hen's eggs simultaneously, several egg stamps 50 can be arranged in series on a stamp bar 18. For this, the respective stamp fastening elements 12 of the egg stamps 50 must be mounted on the stamp bar 18. This can take place in one line for egg tray cartons or even in several lines, so that all the hen's eggs can be printed simultaneously directly in a 6-, 10- or 12-box. Likewise, poultry eggs can be printed in holding devices on egg transportation installations.

The stamp bar 18 must be moved in a controlled manner vertically up and down in order to carry out the printing process. In so doing, the stamp heads 1 of the various egg stamps 50 rise and fall.

The length of the guide rod 13 is designed so that in the absence of an egg in the egg tray carton, the stamp head 1 can not arrive down onto the carton. In addition, however, it is also to be ensured that in the case of the largest conceivable egg, the stamp pressing weight 11 does not come to lie on the stamp fastening element when, in a stamp movement, the stamp bar 18 is disengaged in its lowest position.

The contact pressure of an egg stamp 50 or respectively of the stamp head 1 is determined by the associated stamp pressing weight 11. The shape of the small screen printing plate 4 adapts itself to the surface of the egg on contact and curves in a concave shape towards the stamp chamber 2 and dips partially into the latter. Here, the surface of the small screen printing plate lies with its full surface on the egg and the print motif is transferred.

The printing process is controlled by the articulated stamp pressing element 11, without damaging the egg surface.

To re-fill stamp ink, the printing process only has to be briefly interrupted, so that the stamp ink can be re-filled through the ventilation- and re-filling opening 9. As the small screen printing plate 4 can be easily removed from the stamp head 1, to change the print motif and, in the case of wear of the small screen printing plate 4 by intensive use, a quick exchange is possible. The egg stamp 50 can therefore be operated again after a very short period of standstill.

In addition to the printing process by the movement of the egg stamp 50 onto the surface of the egg, the printing process can be carried out by the movement of the egg which is to be printed, by the pressing of the egg towards the stamp head 1 of the egg stamp 50.

The stamp head 1 which is very robust and complex here in its construction is a high-grade element with a long lifespan, in which the favourably priced small screen printing plates 4 are easily and quickly exchangeable. As mentioned, the stamp ink is also able to be re-filled without difficulty and quickly. The more expensive stamp head 1 is very easy to operate and all the expendable materials are favourably priced and able to be exchanged without the stamp machine being interrupted for a long time.

The stamp head 1 can be produced in a conventional manner as a turned piece from metal, which applies both to the stamp chamber 2 and also to the small screen printing plate mounting 3. However, both parts can also be produced from a flexible plastic, and by injection moulding from plastic or by die casting from certain metal alloys.

List of Reference Numbers
1 stamp head
2 stamp chamber
3 small screen printing plate mounting
4 small screen printing plate
5 tampon
6 tampon pressing element (optional)
7 stamp guiding assembly
8 fastening bead for stamp pressing element
9 ventilation- and re-filling opening
10 stamp pressing element
11 stamp pressing weight
12 stamp fastening element
13 guide rod
14 movement limiter
15 damping ring
16 plastic bearing bush
17 bearing bore (in 12)
18 stamp bar
20 spacer element
41 chamber side
42 pressure side
50 egg stamp
21 cylindrical wall of the stamp chamber
22 covering surface of the stamp chamber
31 internal thread of the small screen printing plate mounting
32 external thread on the cylindrical wall 21 of the stamp chamber
33 pressure surface on the small screen printing plate mounting
34 pressure edge on the cylindrical wall 21
35 annular wall of the small screen printing plate mounting

The invention claimed is:

1. An apparatus for screen printing on a convex surface, the apparatus comprising:
   a stamp head having a cylindrical wall that defines a stamp chamber and a covering surface that closes a first end of the stamp chamber;
   a tampon for containing stamp ink, disposed within the stamp head, having a convex-curved pressure surface;
   a removable, replaceable convex-curved, small screen printing plate that is releasably fastened on the stamp head and stretched across the tampon pressure surface so as to close off a second end of the stamp chamber; and
   a small screen printing plate mounting that is structured and arranged in the form of an annular wall and having a radially inwardly directed pressure surface that removably attaches the small screen printing plate to the stamp head and stretches the small screen printing plate across the tampon pressure surface,
   wherein the small screen printing plate is adapted to invert from a convex-curved shape to a concave-curved shape so that some portion of the small screen printing plate is introduced into the stamp chamber when said small screen printing plate contacts the surface of the convex surface,
   wherein inversion of the small screen printing plate from a convex-curved shape to a concave-curved shape causes compression of the tampon housed within the stamp head and the stamp ink contained therein to pass through the small screen printing plate and onto the convex surface, and
   wherein the stretch imparted on the small screen printing plate by the mounting constrains the concave-curved shape of the small screen printing plate to optimize the printing of the stamp ink onto the convex surface.

2. The apparatus according to claim 1, characterized in that the stamp chamber and the small screen printing plate mounting are connected in a form-fitting and/or force-fitting manner.

3. The apparatus according to claim 1, characterized in that at least one of the stamp chamber and the small screen printing plate mounting is made from a flexible plastic.

4. The apparatus according to claim 1, characterized in that the covering surface of the stamp chamber is equipped with a ventilation and re-filling opening.

5. The apparatus according to claim 1, further comprising a tampon pressing element that is disposed inside of the stamp chamber and that is adapted to press the tampon against the small screen printing plate.

6. The apparatus according to claim 5, characterized in that the covering surface of the stamp chamber contains a concentric milling to receive the tampon pressing element inside the stamp chamber.

7. The apparatus according to claim 5, characterized in that the tampon pressing element is a helical spring.

8. An egg stamp apparatus having at least one apparatus according to claim 1, the egg stamp apparatus further comprising:
   a horizontally-disposed stamp bar that is structured and arranged to operate vertically up and down and to accommodate each apparatus of the at least one apparatus;
   a stamp guiding assembly that is removably attached to the stamp bar and that is structured and arranged to enable each apparatus of the at least one apparatus to move vertically up and down; and
   a stamp pressing element that is structured and arranged to attach each apparatus of the at least one apparatus to the corresponding stamp guiding assembly and to enable the stamp head to incline at a desired angle with respect to the uneven surface.

9. The egg stamp apparatus according to claim 8, characterized in that the stamp pressing element is selected from the group consisting of a ball joint, a helical spring, a rubber elastic element, and a cardan shaft.

10. The egg stamp apparatus according to claim 8, characterized in that the stamp guiding assembly includes a stamp pressing weight disposed at a first end of an elongate guide rod and a movement limiter disposed at a second, opposite end of the elongate guide rod.

11. The egg stamp apparatus according to claim 8, characterized in that the stamp guiding assembly is fastened on the stamp bar with a stamp fastening element.

12. A method of stamping a poultry egg using the egg stamp apparatus according to claim 8, wherein stamping the poultry egg includes bringing the apparatus into contact with the convex surface of the poultry egg while said poultry egg is disposed in at least one of an egg tray carton, an egg box or in holding devices of an egg transportation installation.

13. The method according to claim 12, wherein
   bringing the apparatus into contact with the convex surface of the poultry egg includes moving at least one of said poultry egg, said egg tray carton, said egg box or said holding devices towards the apparatus.

14. A method of stamping a poultry egg using the apparatus according to claim 1, wherein the method comprises:
   bringing the apparatus into contact with a convex surface of the poultry egg so that said apparatus surrounds the contacted convex surface.

15. The method according to claim 14, wherein surrounding the contacted convex surface includes the small screen printing plate adapting to the surface of the poultry egg by inverting from a convex shape to a concave shape towards the stamp chamber so that some portion of the concave shape enters into the stamp chamber.

16. A method of screen printing on a convex surface of a poultry egg using the apparatus according to claim 1, wherein the method comprises:
   bringing the apparatus into contact with the convex surface of the poultry egg so that said stamp head surrounds the convex surface.

17. The method according to claim 16, further comprising:
   disposing the poultry egg in at least one of an egg tray carton, an egg box or in holding devices of an egg transportation installation before the apparatus is brought into contact with the convex surface of the poultry egg.

18. The method according to claim 17, wherein bringing the apparatus into contact with the convex surface of the poultry egg includes moving said poultry egg, said egg tray carton, said egg box or said holding devices towards the stamp head of said apparatus.

19. The apparatus according to claim 1, wherein the small screen printing plate is coated with at least one of a light-sensitive photo-emulsion and a light-sensitive film on a delivery side of said small screen printing plate.

* * * * *